(12) United States Patent
Hallenstål et al.

(10) Patent No.: US 7,043,248 B2
(45) Date of Patent: May 9, 2006

(54) SYSTEM AND METHOD FOR PROVIDING TELECOMMUNICATION SERVICES

(75) Inventors: Magnus Hallenstål, Täby (SE); Steinar Dahlin, Järfälla (SE); Jerker Widmark, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 11 days.

(21) Appl. No.: 10/400,666

(22) Filed: Mar. 28, 2003

(65) Prior Publication Data
US 2005/0261021 A1    Nov. 24, 2005

Related U.S. Application Data

(63) Continuation-in-part of application No. 09/660,289, filed on Sep. 12, 2000, now abandoned.

(30) Foreign Application Priority Data
Sep. 1, 2000     (SE)  ................................. 0003098
Aug. 31, 2001   (WO) ....................... PCT/SE01/01857

(51) Int. Cl.
*H04Q 7/20*     (2006.01)
(52) U.S. Cl. ................... 455/445; 455/461; 455/426.1; 455/552.1
(58) Field of Classification Search ............ 455/456.1, 455/432.1, 414.1, 445, 422.1, 461–462, 428, 455/435.1, 426.1–426.2, 465, 552.1; 379/201.1, 379/207.12, 207.14, 210.01, 211.01
See application file for complete search history.

(56) References Cited

U.S. PATENT DOCUMENTS

| | | | |
|---|---|---|---|
| 5,353,331 A | | 10/1994 | Emery et al. |
| 5,406,615 A | * | 4/1995 | Miller et al. ............. 455/552.1 |
| 5,594,782 A | * | 1/1997 | Zicker et al. ............ 455/552.1 |
| 5,600,705 A | * | 2/1997 | Maenpaa ..................... 455/433 |
| 5,664,005 A | * | 9/1997 | Emery et al. ............ 455/422.1 |
| 5,873,033 A | * | 2/1999 | Hjern et al. ............. 455/426.1 |
| 5,960,356 A | * | 9/1999 | Alperovich et al. ...... 455/432.1 |
| 6,014,377 A | * | 1/2000 | Gillespie .................... 455/445 |

(Continued)

FOREIGN PATENT DOCUMENTS

EP           0700227 A2      3/1996

(Continued)

*Primary Examiner*—Joseph Feild
*Assistant Examiner*—Kamran Afshar
(74) *Attorney, Agent, or Firm*—Nixon & Vanderhye P.C.

(57) ABSTRACT

A system and method for routing an incoming telephone call to a mobile terminal (106) which is a combined cordless phone and mobile phone. The call will be connected over either a fixed network (104) or a mobile network (102) depending on whether the mobile terminal is within or out of radio coverage of a home base station (110) connected to the fixed network. The call is routed in response to a routing indication which is included in the called number of the mobile terminal depending on the location of the mobile terminal. In this way, network operators may direct calls over the fixed network in preference to the mobile network, thereby relieving the mobile network. A single telephone number can also be used for the combined cordless phone and mobile phone.

23 Claims, 3 Drawing Sheets

U.S. PATENT DOCUMENTS

| | | | |
|---|---|---|---|
| 6,097,801 A * | 8/2000 | Williams et al. | 379/221.13 |
| 6,141,547 A * | 10/2000 | Rousseau et al. | 455/426.1 |
| 6,219,539 B1 * | 4/2001 | Basu et al. | 455/417 |
| 6,374,078 B1 | 4/2002 | Williams et al. | |
| 6,377,793 B1 | 4/2002 | Jenkins | |
| 6,236,365 B1 * | 5/2001 | LeBlanc et al. | 455/456.1 |
| 6,356,762 B1 * | 3/2002 | Guenther | 455/456.4 |
| 6,430,395 B1 | 8/2002 | Arazi et al. | |
| 6,735,432 B1 * | 5/2004 | Jarett et al. | 455/417 |
| 6,829,477 B1 * | 12/2004 | Lu et al. | 455/426.1 |
| 6,901,271 B1 * | 5/2005 | Cheah et al. | 455/564 |

FOREIGN PATENT DOCUMENTS

| | | |
|---|---|---|
| WO | 97/09835 | 3/1997 |
| WO | 97/09835 A1 | 3/1997 |
| WO | 97/34437 A1 | 9/1997 |
| WO | 00/08880 A1 | 2/2000 |

* cited by examiner

SYSTEM AND METHOD FOR PROVIDING TELECOMMUNICATION SERVICES

This is a continuation-in-part of U.S. patent application Ser. No. 09/660,289 filed on Sep. 12, 2000 now abandoned. Priority is claimed to International Application PCT/SE01/01857, filed on Aug. 31, 2001, and to Swedish application 0003098-1, filed on Sep. 1, 2000.

TECHNICAL FIELD

The present invention relates to a system and method for providing telecommunication services to a subscriber using a mobile terminal. In particular, telecommunication services are provided over either a fixed network or a mobile network depending on the location of the mobile terminal.

BACKGROUND OF THE INVENTION AND PRIOR ART

Today, there is a rapid increase in the building of new mobile telecommunication networks, such as GSM (Global System for Mobile communication) networks.

A cellular mobile network typically includes a plurality of base stations being connected together by means of switching nodes such as a Base Station Controller (BSC) and/or a Mobile Switching Centre (MSC). Each base station provides radio coverage over an area known as a cell, for radio communication with mobile phones located therein. Each of the base stations and the mobile phones include, among other things, a transceiver for radio communication over radio frequency channels. Each mobile network is allocated by licence a certain limited radio frequency band spectrum for transmissions, and efforts are made by network operators to provide the greatest possible traffic capacity within the allocated frequency band. In other words, the operators attempt to maximise the number of possible ongoing call connections within the limits of the available radio channels.

Mobile networks are built and operated by different operators who have been awarded a licence for a particular frequency band. However, the different frequency bands allocated to the operators are a limited resource for which a licence may be very costly to obtain, at least in some countries.

As mentioned above, operators of mobile networks are usually faced with the problem of how to utilise their frequency band in the most efficient way once the licence has been obtained. Furthermore, some of the operators also own and control a fixed telecommunication network.

When communicating over a fixed network, unlicensed cordless radio technology may be used for so-called cordless phones. A Home Base Station (HBS) is then connected to a fixed line of the fixed network for providing a cordless radio interface between the fixed line and the cordless phone. The cordless phone may be used in a limited area of radio coverage from the HBS using a suitable short distance radio interface, such as Bluetooth, DECT or CT2. Both the HBS and the cordless phone include a transceiver for radio communication over a particular frequency band for which no licence is required.

An operator operating both a fixed network and a mobile network would benefit if more telecommunication traffic is transmitted via the fixed network instead of over the mobile network. By reducing the traffic in the mobile network, it would be possible to use larger cells in the mobile network without having traffic congestion in the cells. This is of particular interest in dense areas such as cities. The cost for network infrastructure is thereby reduced and cell planning is facilitated for the operator.

Using only one mobile terminal for communication over both the fixed and the mobile network, having a single telephone number, would be a great benefit for subscribers. Moreover, if the fixed network can be used in preference to the mobile network, the cost for making calls can also be reduced for subscribers. Further, it would be highly desirable for operators to be able to offer an attractive combined subscription for both mobile and fixed telecommunication to subscribers, involving unified charging among other things.

However, there is a problem to correctly route an incoming call to such a combined mobile terminal over either the fixed network or the mobile network when a single telephone number is used.

SUMMARY

It is an object of the present invention to overcome the problems outlined above. One object is to enable optimization of the use of a fixed network and a mobile network for an operator having control of both. Another object is to enable subscribers to use one mobile terminal and a single telephone number for communication over both a fixed network and a mobile network.

These objects and others are obtained by a combined telecommunication system and a method, using a fixed network, a mobile network and a home base station connectable to the fixed network for providing a cordless short distance radio interface between a mobile terminal and the fixed network. The home base station detects whether the mobile terminal is within radio coverage of the home base station, and updates the combined system when the mobile terminal moves into or out of the radio coverage. A routing indication is included in a called number of an incoming call to the mobile terminal. The routing indication indicates whether the mobile terminal is within radio coverage of the home base station or not. The incoming call to the mobile terminal is routed via the home base station when the mobile terminal is within radio coverage of the home base station, and via the mobile network when the mobile terminal is out of radio coverage of the home base station, in response to the routing indication included in the called number.

The home base station may dial an updating code for updating the combined system on whether the mobile terminal is within radio coverage of the home base station or not.

Information on whether the mobile terminal is within radio coverage of the home base station or not may be stored in a location database of the fixed network. A routing indication is then added to the called number by the location database upon query in connection with an incoming call.

Information on whether the mobile terminal is within radio coverage of the home base station or not may alternatively be stored in a Home Location Register of the mobile network. The routing indication is then added to the called number by the Home Location Register if the mobile terminal is within radio coverage of the home base station, upon query in connection with an incoming call. The routing indication is then provided as a roaming number given by the Home Location Register if the mobile terminal is out of radio coverage of the home base station, upon query in connection with an incoming call.

The routing indication is preferably removed from the called number before connecting the incoming call to the mobile terminal.

The present invention provides functionality which automatically takes care of roaming between the mobile network and the fixed network. Thus, when the user is out of radio coverage of a home base station using the cordless radio interface, the user will receive and make calls over the mobile network. On the other hand, when the user is within the home base station coverage, he/she will be called and make calls over the home base station and the access line of the fixed network. The routing of calls is thus performed in response to the routing indication included in the called number.

A subscriber is thus able to use a mobile terminal which is a combined cordless phone and mobile phone having a single telephone number. The terms "cordless phone" and "mobile phone" are here used to distinguish between unlicensed cordless radio technology and licensed cellular mobile network technology. The "cordless" part of the terminal may operate by using any suitable short distance radio interface, such as according to the Bluetooth, DECT or CT2 standards. The "mobile" part of the terminal may operate using any cellular mobile communication standard, such as the GSM standard. The present invention is thus not limited to any particular cordless and mobile technologies or standards.

Some further benefits for the subscribers are that better quality is generally obtained over the HBS and the fixed network, and that the battery consumption in the mobile terminal is low when connected to the HBS. The cost for making calls over the fixed network is also generally lower. The benefits for the operator are that existing infrastructure may be used, and that larger cells can be used, since it is possible to direct mobile calls through the fixed network by preference instead of the mobile network, thereby relieving the mobile network. Also, if the fixed line, such as a PSTN or ISDN line, of a subscriber is busy, an incoming call can be re-routed over the mobile network.

Additional advantages include that the subscribers telephone number can be maintained or only slightly changed, such as by adding a suffix or a prefix. Also, the feature of calling number presentation can be maintained, since the same number is used when calling over either the mobile network or the fixed network.

Furthermore, users will be able to roam into other networks, e.g., GSM based networks, outside his own country, thereby providing a mobile terminal capable of global use.

BRIEF DESCRIPTION OF THE DRAWINGS

The present invention will now be described in more detail with reference to the accompanying drawings, in which.

DESCRIPTION OF PREFERRED EMBODIMENTS

In the following exemplary embodiments, the cordless radio interface between the fixed network and the combined cordless and mobile telephone is assumed to be a Bluetooth based interface. However, as stated above, any suitable short distance radio interface, such as a DECT interface or a CT2 interface, may be used instead for connection between the cordless telephone and the fixed network.

Figure 1:
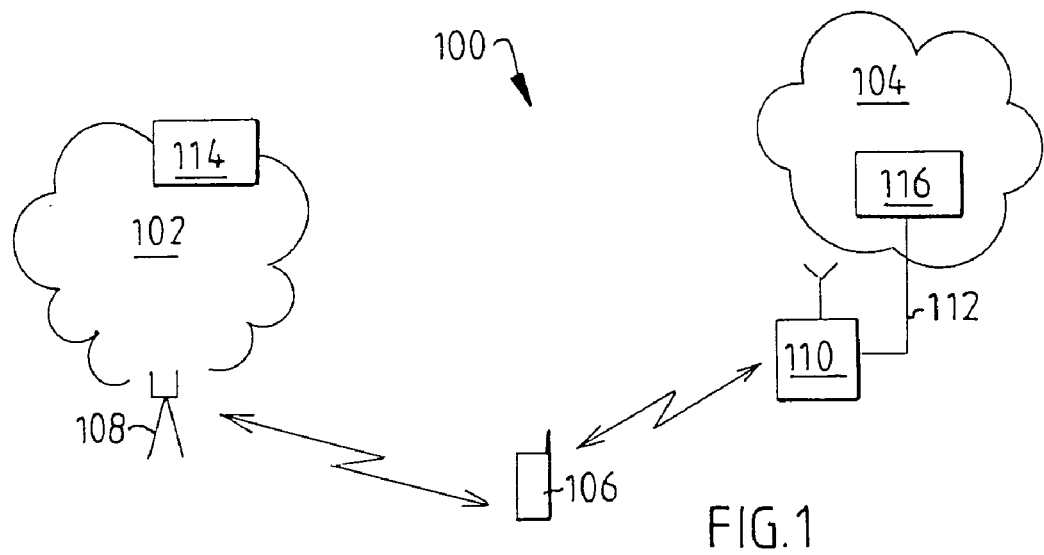
FIG. 1 is a general view of a combined mobile and fixed network.

With reference to FIG. 1, a combined telecommunication system 100 comprises both a mobile network 102, such as a GSM network, and a fixed network 104, such as a Public Switched Telephony Network (PSTN), for providing telecommunication services for a mobile terminal 106. The mobile network 102 includes base stations 108 providing an interface between the mobile terminal 106 and the mobile network 102. For the sake of simplicity, only one base station 108 is shown in FIG. 1. A fixed subscription line 112 of the fixed network 104 is connected to a Home Base Station (HBS) 110 providing an interface between the mobile terminal 106 and the fixed network 104. The HBS 110 may be capable of having several mobile terminals or cordless phones, not shown, associated therewith. Furthermore, the mobile terminal 106 used in this example is capable of connecting both to the HBS 110 providing the cordless interface, and to the mobile network 102.

If the mobile terminal 106 is located within the cordless radio coverage of the HBS 110, all incoming and outgoing calls are routed over the HBS 110 of the fixed subscription line 112, using the cordless radio interface. On the other hand, if the mobile terminal 106 is located out of radio coverage of the HBS 110, the calls are routed over the base station 108 of the mobile network 102.

The HBS 110 is capable of detecting whether the mobile terminal 106 is present within the radio coverage of the HBS 110, and of updating the combined system 100 accordingly. The present invention is not limited to any particular presence detection method, and any previously known technique may be used, which will not be described here further. Thus, apart from being capable of communication with both the HBS 110 and the base stations 108 of the mobile network 102, there are no specific requirements on the mobile terminal 106, such as for any capability of selecting between the two interfaces.

When it is detected by the HBS 110 that the mobile terminal 106 enters into its radio coverage, the HBS 110 updates the combined system 100 by either updating the fixed network 104 or the mobile network 102. In a preferred embodiment, the HBS 110 updates the combined system 100 by dialing a specific updating code, which may be a normal forwarding code (e.g. *21* . . . ) or a specific number (e.g. 400 . . . ). A security code may also be appended to the dialled updating code in order to increase the security. Later, when the mobile terminal 106 exits from the radio coverage of the HBS 110, a similar procedure is performed for updating the combined system 100 accordingly.

According to one embodiment, the updating code dialled by the HBS 110 leads to the fixed network 104 and is interpreted such that the call ends up in an IN SSP (Intelligent Network Service Switching Point), not shown. In response to the received call from the HBS 110, the IN SSP updates the location of the mobile terminal 106 in a location database of the fixed network 104, e.g., a Number Portability Database Cluster, not shown in FIG. 1. In another embodiment, the updating code dialled by the HBS 110 leads to the mobile network 102, which will be described later.

Thus, when a call is made to a subscriber using the mobile terminal 106, the location database is queried to determine if the mobile terminal 106 is within or out of radio coverage of the HBS 110. A routing indication, such as a prefix, is then added to the called number in response to the query. The routing indication is selected to indicate whether the mobile terminal 106 is within or out of radio coverage of the HBS 110. The routing indication added to the called number will then guide the call to either a Gateway Mobile Switching Centre (GMSC) 114 in the mobile network 102, or a Local Exchange (LE) 116 in the fixed network 104, depending on the location of the called mobile terminal 106 as indicated. Once the incoming call reaches the GMSC 114 or the LE 116, the routing indication can be removed from the called number. If the call is routed to the LE 116, then the mobile terminal 106 can be connected immediately. If the call is routed to the GMSC 114, a normal mobile call procedure, e.g., in accordance with GSM, is executed before connecting to the mobile terminal 106.

In this inventive arrangement, one and the same telephone number of the mobile terminal is valid in both the fixed network and the mobile network, thereby avoiding separate numbers for two subscriptions, which is an advantage to the subscriber. Further, the feature of calling number presentation can work correctly in both mobile and cordless connections.

The technique as described herein can be gradually introduced in networks in different phases. Thus, in a first phase, the interrogation to a location database regarding the location of a called mobile terminal is done late in the call chain, e.g., at the end LE. Then gradually, the interrogation can be done earlier in the call chain. With a high penetration of the service, it is advantageous to perform the interrogation early in order to use network trunks more efficiently.

Figure 2:
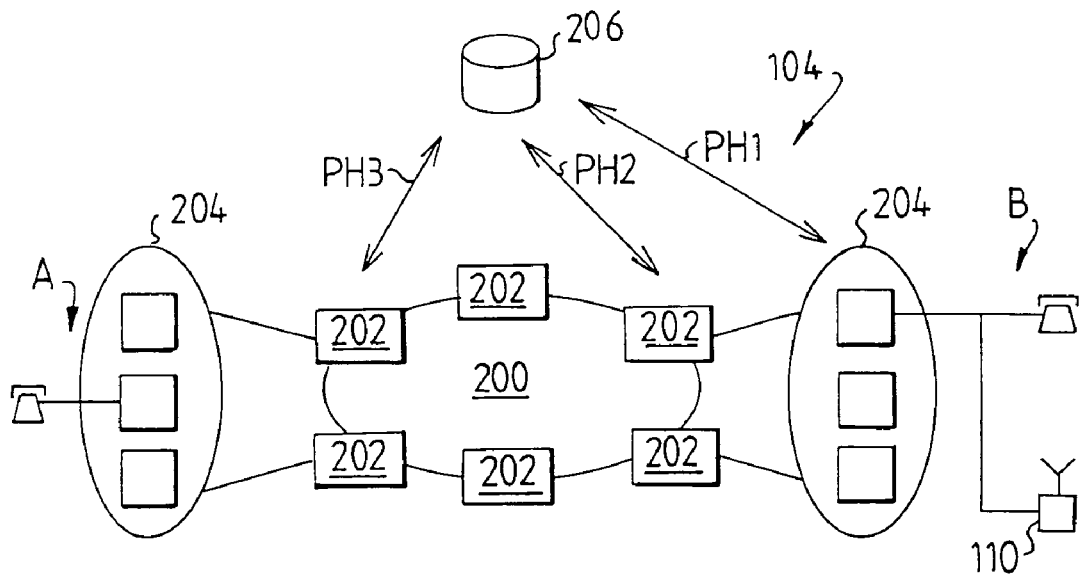
FIG. 2 is a schematic view of a network configuration in which the invention may be implemented.
Figure 2:
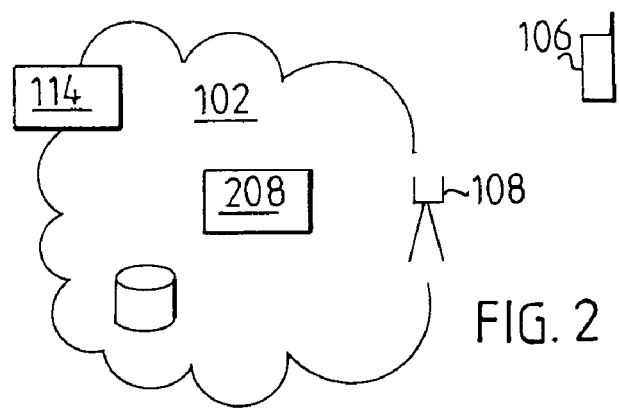

FIG. 2 illustrates a network configuration where three different phases are indicated for introducing the present invention in an exemplary communication scenario. In this example, an HBS 110 of a subscriber B is connected to a PSTN access network 104. ISDN access may also be implemented using a similar technique or new and/or existing signalling could be used. The PSTN access network 104 includes a transit network 200 of interconnected Transit Exchanges (TEs) 202 to which a plurality of Local Exchanges (LEs) 204 are connected. the PSTN access network 104 is further connected to a location database 206, e.g., a Number Portability Database Cluster which in reality may comprise a plurality of data bases. A subscriber A is assumed to make a call to the subscriber B. In FIG. 2, interrogation to the location database 206 regarding the location of the mobile terminal 106 of the called subscriber B is indicated for different phases as phase 1 (PH1), phase 2 (PH2) and phase 3 (PH3), respectively.

Figure 3A:
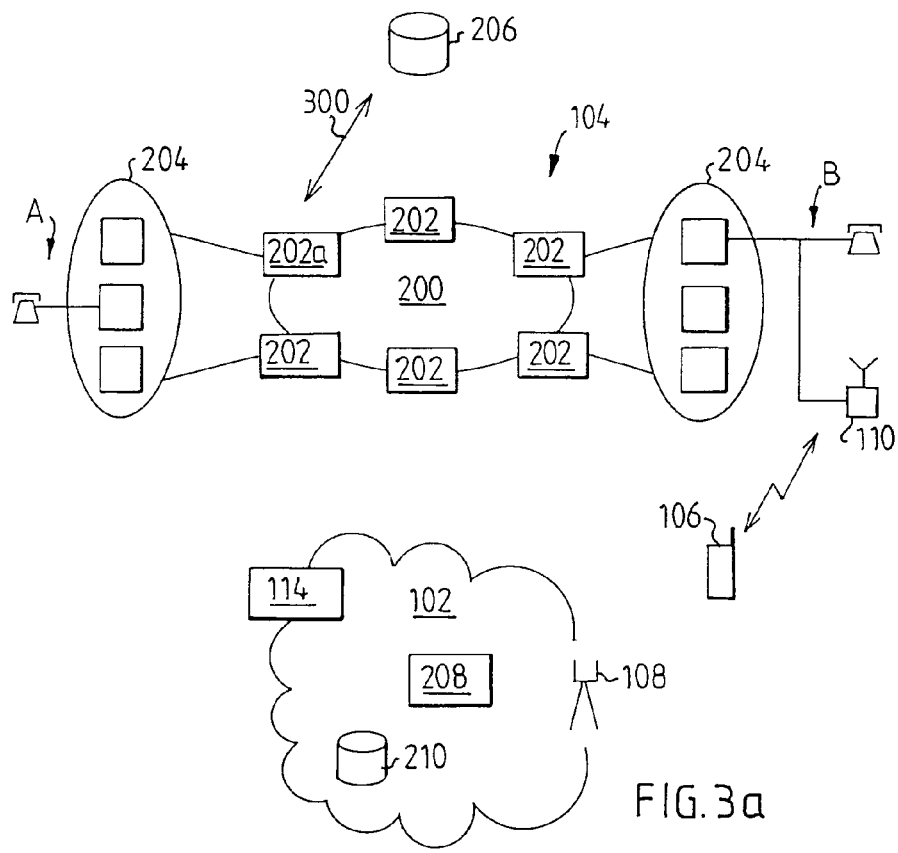
FIGS. 3a, 3b are schematic views of a network configuration according to one aspect of the invention.

FIG. 3a illustrates the routing of an incoming call from a subscriber A to a subscriber B having a mobile terminal 106, which is a combined cordless phone and a mobile phone according to, e.g., Bluetooth and GSM standards, respectively. The mobile network 102 includes a GMSC 114, a Mobile Switching Centre (MSC) 208 and a Home Location Register (HLR) 210. In this case, the mobile terminal 106 is present within the radio coverage of the HBS 110.

Thus, when the call is routed to a TE 202a, a location query 300 including the called number is sent to a location database 206 for checking if the mobile terminal 106 is within range of the HBS 110. The location database 206 replies by adding a routing indication R1, such as a prefix, to the called number. In this case, the routing indication R1 indicates that the mobile terminal 106 is within radio coverage of the HBS 110. The call is then routed from the TE 202a to the local HBS 110 of the subscriber B for connection to the mobile terminal 106. The routing indication R1 is removed from the called number before connecting to the mobile terminal 106, preferably when the call reaches the LE 204 to which the HBS 110 is connected.

Figure 3B:
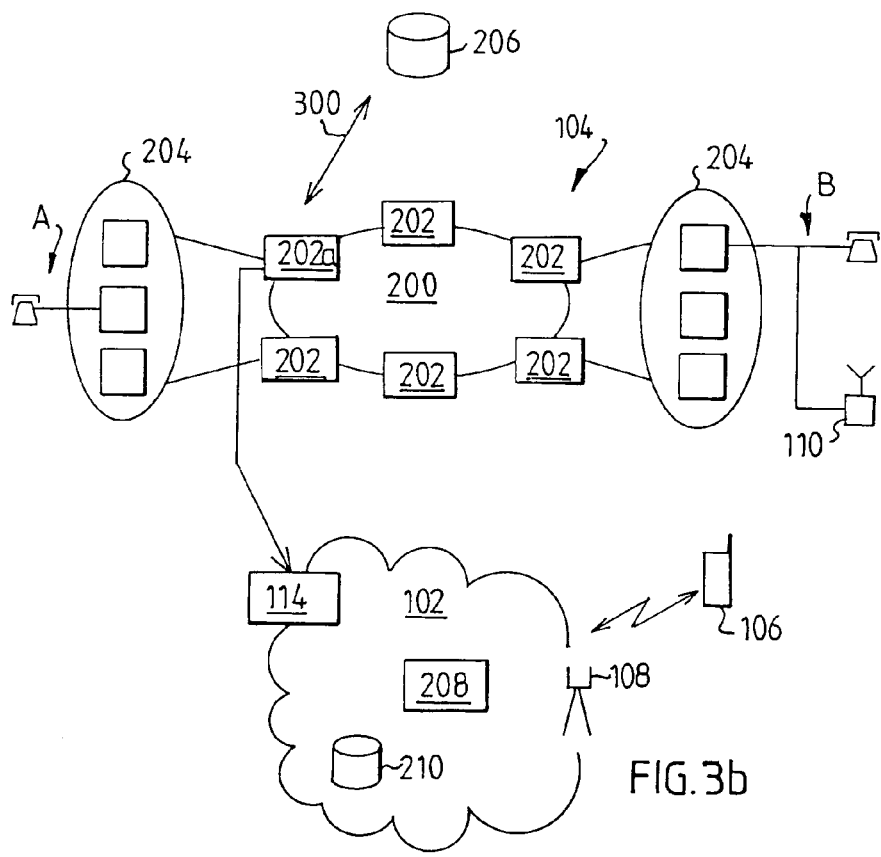

FIG. 3b illustrates the routing of an incoming call from a subscriber A to a subscriber B where the mobile terminal 106 is out of radio coverage of the HBS 110. Thus, as in the previous example of FIG. 3a, it is first checked in the location database 206, by sending a location query 300, if the mobile terminal 106 is within radio coverage of the HBS 110. In this case however, the location database 206 replies by adding a routing indication R2 to the called number, indicating that the mobile terminal 106 is out of radio coverage of the HBS 110. The call is then routed from the TE 202a to the GMSC 114 of the mobile network 102 and further over the MSC 208 and the base station 108 to the mobile terminal 106. The routing indication R2 is preferably removed from the called number before connecting to the mobile terminal 106, preferably when the call reaches the GMSC 114.

In the examples of FIG. 3a and 3b, it is assumed that the HBS 110 constantly updates the fixed network 104, i.e. the location database 206, as described above whenever the mobile terminal 106 moves in or out of radio coverage of the HBS 110.

According to an alternative embodiment of the invention, the HBS 110 constantly updates the HLR 210 in the mobile network 102 on the location of the mobile terminal 106 in relation to the radio coverage of the HBS 110. In this case, incoming calls to the mobile terminal 106 are first routed to the GMSC 114 which checks the current mobile terminal 106 location with the HLR 210.

Figure 4:
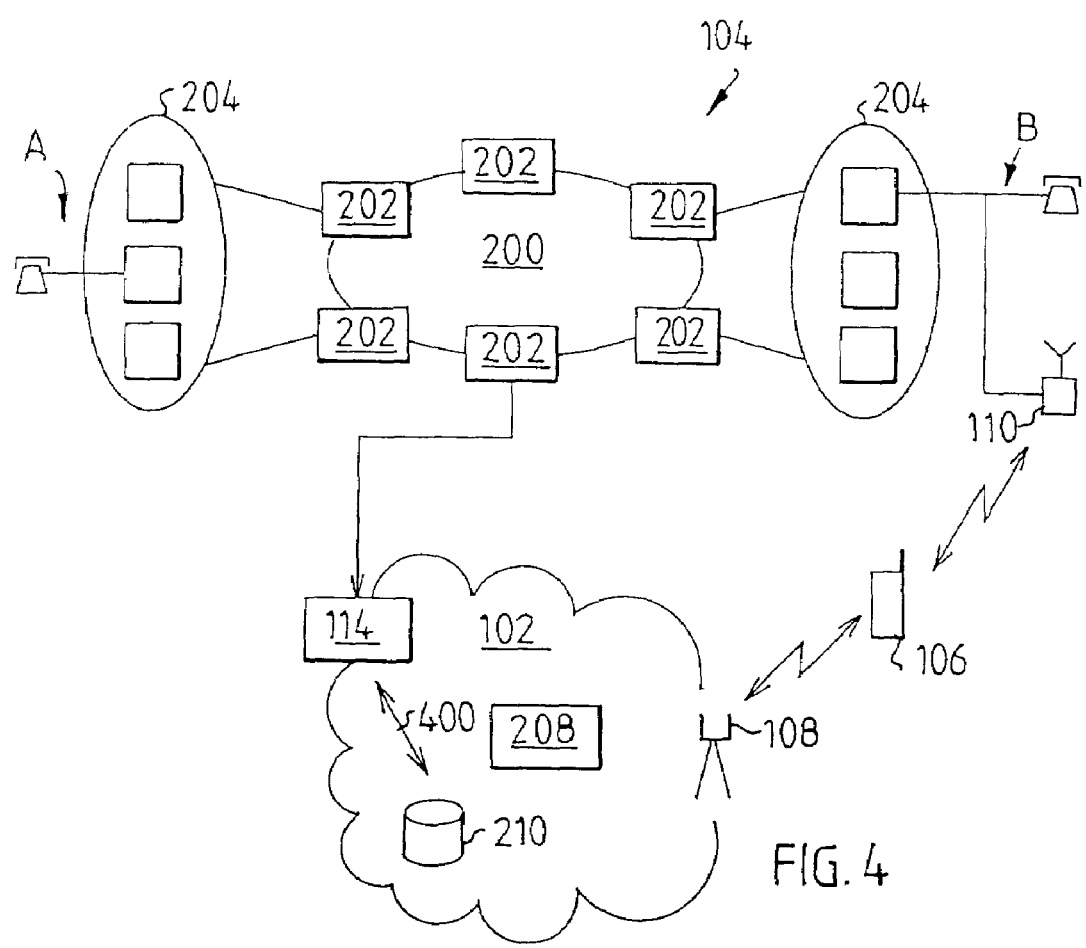
FIG. 4 is a schematic view of a network configuration according to another aspect of the invention.

In FIG. 4, the routing of an incoming call to the mobile terminal 106 is illustrated, where the mobile network 102 receives updates from the HBS 110 on whether the mobile terminal 106 is outside or inside HBS radio coverage.

Thus in this embodiment, a call to the mobile terminal 106 is first routed to the GMSC 114, which sends a location query 400, including the called number, to the HLR 210 for checking the location of the mobile terminal 106 in relation to the HBS 110 radio coverage. The HLR 210 normally gives the GMSC 114 a roaming number. If the mobile is outside HBS coverage, the roaming number will point to an MSC 208 in a conventional manner. In this case, the roaming number can be regarded as a routing indication. However if the mobile is within HBS range, then a new roaming number is created by adding a routing indication, e.g., a prefix, to the ordinary telephone number, wherein the call is routed over the fixed network 104. The routing indication may then be removed from the telephone number, preferably by the LE 204 to which the HBS 110 is connected, and connect the call to the mobile terminal 106 as described above.

To indicate whether the mobile terminal 106 is inside or outside the HBS coverage, the HBS 110 can use the same procedure as described above for the previous embodiment. However, instead of updating the location database 206, such as a number portability database cluster by means of the IN SSP, the HBS 110 updates the HLR 210, preferably using an Intelligent Network Application Protocol (INAP) interface.

The rest of the network components may be standard components and it is not required to implement support for Number portability in the GMSC. Optimised routing is also possible, since the HLR inquiry may be performed from any GMSC.

Furthermore, in any of the above-described embodiments of the invention, the same single telephone number can be used for a mobile terminal in the GSM network as in the fixed network, which is a simple way to support a coherent calling number presentation for calls from the mobile terminal. This is also a great advantage since many subscribers are reluctant to change their phone numbers. Further, if there are plural persons in a group or family, each individual may be differentiated by a slight variation of the telephone number, e.g. by means of a suffix. Possibly a user of this service could get a new prefix. The old number (including area code) can still lead to home.

For example, if a family's current fixed home phone number is X, the fixed home phone will still be reached on this number. In addition to the fixed home telephone number, family members may be equipped with a mobile terminal, such as a combined GSM and Bluetooth telephone. The family members can be reached on their individual handsets for example by adding a suffix to X, thus X+n where n={1, 2, 3 ... }. n=0 or no suffix at all may indicate the fixed home phone in general.

Using the invention as described herein will achieve a number of advantages compared to conventional network solutions. Thus, an existing fixed network can be used to optimise a mobile network. Further, the inventive solution enables subscribers to maintain their old telephone number of the fixed subscription, and calling number presentation will work globally, since the same number is used both in the fixed network and the mobile network.

While the invention has been described with reference to specific exemplary embodiments, the description is only intended to illustrate the inventive concept and should not be taken as limiting the scope of the invention. Various alternatives, modifications and equivalents may be used without departing from the spirit of the invention, which is defined by the appended claims.

The invention claimed is:

1. A combined telecommunication system, comprising:
   a fixed network,
   a mobile network,
   a home base station connectable to the fixed network for providing a wireless interface between a mobile terminal and the fixed network, the home base station including means for detecting whether the mobile terminal is within radio coverage of the home base station, and means for updating the combined system when the mobile terminal moves into or out of the radio coverage,
   means for including a routing indication in a called number of an incoming call to the mobile terminal, the routing indication indicating whether the mobile terminal is within radio coverage of the home base station or not, and
   means for routing the incoming call to the mobile terminal via the home base station when the mobile terminal is within radio coverage of the home base station, and via the mobile network when the mobile terminal is out of radio coverage of the home base station, in response to the routing indication included in the called number.

2. A system according to claim 1, wherein the home base station is configured to dial an updating code for updating the combined system on whether the mobile terminal is within radio coverage of the home base station or not.

3. A system according to claim 1, the fixed network comprising a location database configured to store information on whether the mobile terminal is within radio coverage of the home base station or not.

4. A system according to claim 3, the location database being configured to add the routing indication to the called number, upon query in connection with an incoming call.

5. A system according to claim 1, the mobile network comprising a Home Location Register configured to store information on whether the mobile terminal is within radio coverage of the home base station or not.

6. A system according to claim 5, the Home Location Register being configured to add the routing indication to the called number if the mobile terminal is within radio coverage of the home base station, upon query in connection with an incoming call.

7. A system according to claim 5, the Home Location Register being configured to provide a roaming number as the routing indication if the mobile terminal is out of radio coverage of the home base station, upon query in connection with an incoming call.

8. A system according to claim 1, the system being configured to remove the routing indication from the called number before connecting the incoming call to the mobile terminal.

9. In a combined telecommunication system comprising a fixed network, a mobile network and a home base station connectable to the fixed network for providing a wireless interface between a mobile terminal and the fixed network, the home base station being configured to detect whether the mobile terminal is within radio coverage of the home base station, and to update the combined system as the mobile terminal moves into or out of the radio coverage, a method of routing an incoming call to a mobile terminal, comprising the steps of:
   including a routing indication in the called number of the incoming call to the mobile terminal, the routing indication indicating whether the mobile terminal is within radio coverage of the home base station or not, and
   routing the incoming call to the mobile terminal via the home base station when the mobile terminal is within radio coverage of the home base station, and via the mobile network when the mobile terminal is out of radio coverage of the home base station, in response to the routing indication included in the called number.

10. A method according to claim 9, comprising the further step of the home base station dialling an updating code for updating the combined system on whether the mobile terminal is within radio coverage of the home base station or not.

11. A method according to claim 9, comprising the further step of storing information on whether the mobile terminal is within radio coverage of the home base station or not in a location database of the fixed network.

12. A method according to claim 11, comprising the further step of adding the routing indication to the called number by the location database upon query in connection with an incoming call.

13. A method according to claim 9, comprising the further step of storing information on whether the mobile terminal is within radio coverage of the home base station or not in a Home Location Register of the mobile network.

14. A method according to claim 13, comprising the further step of adding the routing indication to the called number by the Home Location Register if the mobile terminal is within radio coverage of the home base station, upon query in connection with an incoming call.

15. A method according to claim 13, comprising the further step of providing the routing indication in a roaming number given by the Home Location Register if the mobile terminal is out of radio coverage of the home base station, upon query in connection with an incoming call.

16. A method according to claim 9, comprising the further step of removing the routing indication from the called number before connecting the incoming call to the mobile terminal.

17. Apparatus for use in a combined telecommunication system that includes a fixed network and a mobile network, comprising:

- a home radio base station connectable to the fixed network for providing a wireless interface between a mobile terminal and the fixed network, the home base station including electronic circuitry configured to detect whether the mobile terminal is within radio coverage of the home base station and to generate an update when the mobile terminal moves into or out of the radio coverage,
- location circuitry configured to include a routing indication in a called number of an incoming call to the mobile terminal, the routing indication indicating whether the mobile terminal is within radio coverage of the home base station or not, and
- wherein the routing indication included in the called number directs routing of the incoming call to the mobile terminal via the home base station when the mobile terminal is within radio coverage of the home base station and via the mobile network when the mobile terminal is out of radio coverage of the home base station.

18. Apparatus according to claim 17, wherein the home base station is configured to dial an updating code for updating the combined system on whether the mobile terminal is within radio coverage of the home base station or not.

19. Apparatus according to claim 17, wherein the location circuitry includes a location database in the fixed network configured to store information on whether the mobile terminal is within radio coverage of the home base station or not.

20. Apparatus according to claim 19, wherein the location database is configured to add the routing indication to the called number upon a query in connection with an incoming call.

21. Apparatus according to claim 17, wherein the location circuitry includes a Home Location Register in the mobile network configured to store information on whether the mobile terminal is within radio coverage of the home base station or not.

22. Apparatus according to claim 21, wherein the Home Location Register is configured to add the routing indication to the called number if the mobile terminal is within radio coverage of the home base station upon a query in connection with an incoming call.

23. Apparatus according to claim 21, wherein the Home Location Register is configured to provide a roaming number as the routing indication if the mobile terminal is out of radio coverage of the home base station upon a query in connection with an incoming call.

* * * * *